(12) United States Patent
Perrault

(10) Patent No.: US 12,159,431 B2
(45) Date of Patent: Dec. 3, 2024

(54) METHOD FOR DETERMINING CALIBRATION PARAMETERS FOR AN IMAGING DEVICE, AND ASSOCIATED COMPUTER PROGRAM PRODUCT

(71) Applicant: IDEMIA IDENTITY & SECURITY FRANCE, Courbevoie (FR)

(72) Inventor: Pierre Perrault, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/050,744

(22) Filed: Oct. 28, 2022

(65) Prior Publication Data
US 2023/0136084 A1 May 4, 2023

(30) Foreign Application Priority Data

Nov. 4, 2021 (FR) ..................... 21 11700

(51) Int. Cl.
*G06T 7/80* (2017.01)
*G06T 7/00* (2017.01)
*G06T 7/77* (2017.01)

(52) U.S. Cl.
CPC ............. *G06T 7/80* (2017.01); *G06T 7/77* (2017.01); *G06T 7/97* (2017.01); *G06T 2207/30196* (2013.01)

(58) Field of Classification Search
CPC .... G06T 7/80; G06T 7/77; G06T 7/97; G06T 2207/30196; G06T 2207/30232; G06T 2207/30244
See application file for complete search history.

(56) References Cited

U.S. PATENT DOCUMENTS

2012/0327220 A1* 12/2012 Ma ................. G06T 7/292
  348/135
2014/0293043 A1* 10/2014 Datta ............. G06T 7/60
  348/135
(Continued)

FOREIGN PATENT DOCUMENTS

CN        112287869 A   *  1/2021

OTHER PUBLICATIONS

French Preliminary Search Report Issued Jun. 14, 2022, in French Application 21 11700 filed on Nov. 4, 2021(with English Translation of Categories of Cited Documents & Written Opinion, 12 pages.

(Continued)

*Primary Examiner* — Michael Lee
(74) *Attorney, Agent, or Firm* — Oblon, McClelland, Maier & Neustadt, L.L.P.

(57) ABSTRACT

A method for determining calibration parameters for an imaging device by way of a computer, based on at least one image having at least one person including selecting, by way of the computer, a plurality of pairs of points in the at least one image, each pair of points comprising a head point and a foot point associated with the person, and determining calibration parameters by way of the computer, using a two-dimensional estimator able to determine one of the estimated image coordinates of a head point based on the image coordinates of the foot point of a person and on the calibration parameters, determining the calibration parameters comprising minimizing an error between said estimated image coordinates of the head point and said image coordinates of the corresponding head point.

11 Claims, 5 Drawing Sheets

(56) References Cited

U.S. PATENT DOCUMENTS

| | | | |
|---|---|---|---|
| 2015/0029345 A1* | 1/2015 | Ikeda | G06T 7/80 |
| | | | 348/187 |
| 2020/0005490 A1* | 1/2020 | Paik | G06T 7/80 |
| 2021/0192773 A1* | 6/2021 | Zhang | G06T 7/50 |
| 2022/0028114 A1* | 1/2022 | Lee | G06T 7/75 |
| 2022/0327838 A1* | 10/2022 | Santillo | A61B 5/1079 |
| 2023/0057733 A1* | 2/2023 | Yoshioka | G06V 40/103 |

OTHER PUBLICATIONS

Li et al., "A Simplified Nonlinear Regression Method for Human Height Estimation in Video Surveillance", EURASIP Journal on Image and Video Processing, 2015, 9 Pages.

Liu et al., "Surveillance Camera Autocalibration Based on Pedestrian Height Distributions", Surveillance Camera Autocalibration, 2011, 11 Pages.

Brouwers et al., "Automatic Calibration of Stationary Surveillance Cameras in the Wild", Springer International Publishing Switzerland, 2016, 17 Pages.

Xu et al. "Estimating 3D Camera Pose from 2D Pedestrian Trajectories", IEEE, 2020, 10 Pages.

\* cited by examiner

METHOD FOR DETERMINING CALIBRATION PARAMETERS FOR AN IMAGING DEVICE, AND ASSOCIATED COMPUTER PROGRAM PRODUCT

CROSS-REFERENCE TO RELATED APPLICATION

The present application claims priority to French Patent Application No. 21 11700, filed on Nov. 4, 2021. The entire content of the foregoing is incorporated herein by reference.

The present invention relates to imaging-based surveillance, and relates more specifically to a method for automatically determining calibration parameters for an imaging device, in particular in order to estimate real distances based on images from an imaging device.

The prior art discloses detection algorithms, for example implemented using neural networks, in particular convolutional neural networks or CNN, in order to identify elements of interest in images.

For example, it is known to detect people or faces in security camera images.

Proceeding from this, if the parameters of the camera (called calibration parameters), such as the height at which it is positioned, its angle of inclination and its focal length, are known, a few simple geometric considerations and projections make it possible to estimate the quantities of the detected elements of interest, and generally to measure any "real" distance in the observed scene.

The difficulty is linked essentially to easily determining the calibration parameters. Indeed, thousands of cameras are already installed without their parameters being known. Of course, it would be possible to send people to take measurements on all of these cameras, but this would be a time-consuming, expensive and constrictive process.

There is also the need to estimate real distances based on images from an imaging device of which no characteristics are known, for example based on a video posted on the Internet or else based on a video taken using a mobile device the height and inclination of which vary little over time.

One automatic calibration method has been proposed, this being described in the document "A simplified nonlinear regression method for human height estimation in video surveillance", Li, S., Nguyen, V. H., Ma, M. et al.

This method ends up estimating the height of people based on a surveillance camera video. In this method, a person of known size walking in front of the camera is chosen, so as to acquire multiple images in which the person is at various positions in space. Next, it is possible to determine the calibration parameters through regression on the positions of said person's head and feet.

This method is based on the assumption that a person has an essentially vertical representation in an image and that therefore the component along a vertical ordinate axis of a foot-head vector provides more information than the component along a horizontal abscissa axis of said foot-head vector, said component along the ordinate axis being able to be associated with the height of the person via the calibration parameters. The calibration parameters may thus be determined easily, using simplified mathematical equations neglecting the terms along the abscissa axis.

This method has the drawback of being suitable for limited use of the actual estimation of the height of people in images taken by a camera, and of requiring a specific prior calibration scenario during which a person of known size moves in front of said camera.

Indeed, this method does not give satisfactory calibration parameters for computing any real distances based on the images. When the representations of people in the images are inclined by a perspective effect, the estimated heights are inaccurate.

As an alternative, the document "Surveillance Camera Autocalibration based on Pedestrian Height Distributions", Jingchen Liu, Robert T. Collins, Yanxi Li has proposed to use the estimation of vanishing points to evaluate the calibration parameters for the camera. It is thus possible to use any images from the camera as long as they show a large number of people assumed to be vertical (without specifically having to ask a subject to walk).

However, it is observed that estimating vanishing points remains a complex task in itself, which is sometimes difficult to apply generally and constitutes an excessively expensive aim, meaning that this method does not provide satisfaction.

The invention aims to solve the abovementioned problems of the prior art by proposing a method for determining calibration parameters for an imaging device that is completely automatic, simple, robust and universal.

The invention relates to a method for determining calibration parameters for an imaging device by way of a computer, based on at least one image acquired by the imaging device and comprising multiple people or based on a plurality of images (i, $i_1$-$i_N$) acquired by the imaging device (10) at different instants in time and comprising at least one person, the method for determining calibration parameters comprising the following steps:

a step of selecting, by way of the computer, a plurality of pairs of points in the at least one image, each pair of points comprising a head point associated with the head of a person and a foot point associated with the feet of said person, each point of a pair of points being referenced in the at least one image by image coordinates comprising an image abscissa and an image ordinate, each pair of points defining a foot-head segment in the three-dimensional real world of the environment of the imaging device, a step of determining calibration parameters by way of the computer, wherein the computer comprises an estimator able to determine an estimated image ordinate of a head point based on the image ordinate of the foot point of a person and on the calibration parameters through an approximation that, in the three-dimensional real world of the environment of the imaging device, all foot-head segments have the same predetermined height and are vertical, the estimator being two-dimensional and furthermore being able to determine an estimated image abscissa of a head point based on the image coordinates of the foot point, determining the calibration parameters comprising minimizing an error between said estimated image coordinates of the head point estimated by the two-dimensional estimator and said image coordinates of the corresponding head point.

According to one aspect of the invention, the selection step comprises determining the foot point as a midpoint between a right foot point and a left foot point.

According to one aspect of the invention, the calibration parameters comprise:

a transverse angle of inclination θ of the imaging device,
a focal length f of the imaging device,
a height c at which the imaging device is positioned,
the estimator determining the estimated image coordinates (x't, y't) based on the image coordinates of the foot point (xp, yp) using the following equations:

$$x't = \frac{\cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot xp$$

and $$y't = \frac{H \cdot \cos(\theta) - \sin(\theta) \cdot c \cdot \frac{\sin(\theta) \cdot yp - f \cdot \cos(\theta)}{\cos(\theta) \cdot yp + f \cdot \sin(\theta)} - c \cdot \cos(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot f$$

According to one aspect of the invention, the error minimization comprises using a regression algorithm that minimizes a mean squared error function between said estimated image coordinates of the head point estimated by the estimator and said image coordinates of the corresponding head point.

According to one aspect of the invention, the error minimization comprises an exhaustive search for the calibration parameters (f, θ, c) over a predetermined discretized domain.

According to one aspect of the invention, the error minimization comprises using a gradient descent method.

According to one aspect of the invention, the error minimization comprises two steps, a first step comprising an exhaustive search for intermediate calibration parameters over a predetermined discretized domain, and a second step comprising using a gradient descent method initialized on said intermediate calibration parameters resulting from the first step.

According to one aspect of the invention, the selection step furthermore comprises a filtering step in which the computer filters pairs of points of the plurality of pairs of points based on a visibility criterion of said points, in order to select the plurality of pairs of points.

According to one aspect of the invention, the at least one image acquired by the imaging device is divided into a plurality of areas, the plurality of pairs of points being selected by the computer in the selection step such that each area contains a number of pairs of points less than or equal to a predetermined threshold.

According to one aspect of the invention, the plurality of pairs of points results from a plurality of images acquired by the imaging device, the number of images corresponding to a predefined time period in which images are recorded by the imaging device.

According to one aspect of the invention, each image of the plurality of images results from a selection of images from the imaging device by the computer corresponding to a period greater than 100 ms.

The invention also relates to a computer program product comprising program instructions implementing the steps of the method for determining calibration parameters when the program instructions are executed by a computer.

Other advantages and features of the invention will become apparent upon reading the description and the drawings.

Figure 4A:
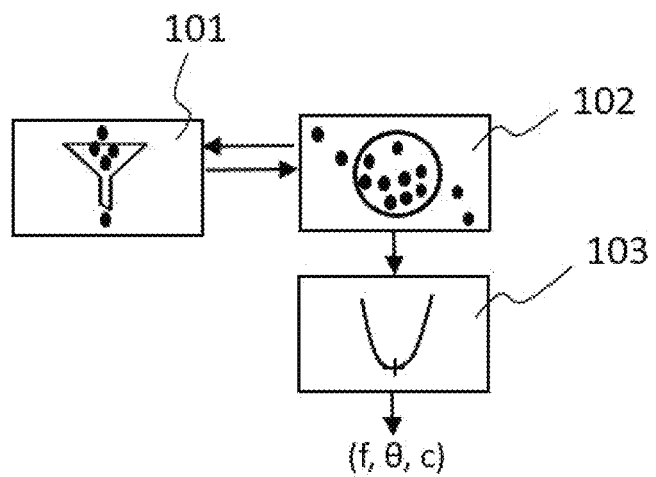

FIG. 4*a* shows the steps of the method for determining calibration parameters according to the invention.

Figure 4B:
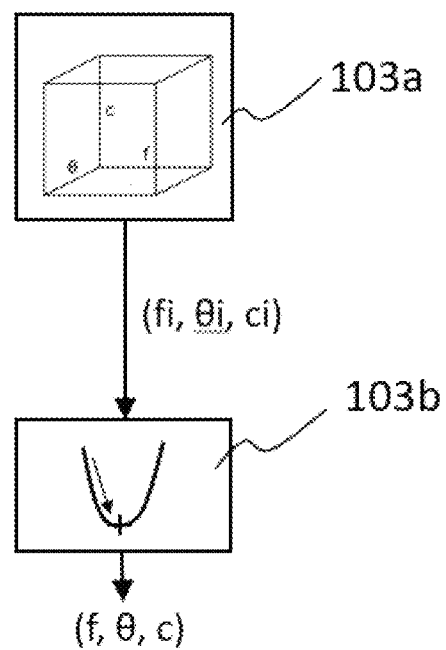

FIG. 4*b* shows one particular embodiment of a minimization step of the method for determining calibration parameters according to the invention.

Figure 5A:
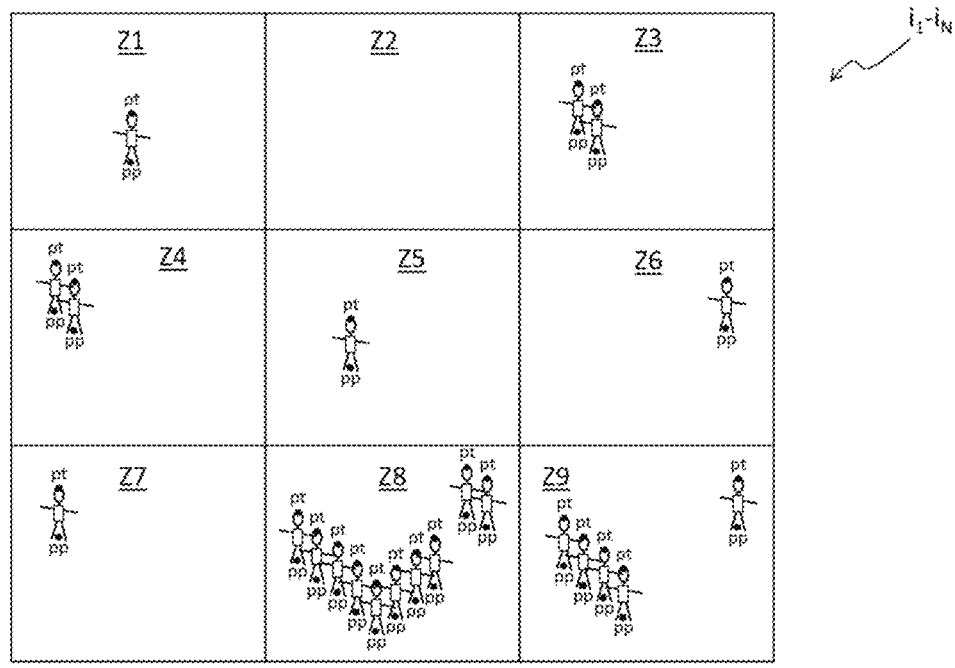

FIG. 5*a* illustrates a superposition of multiple images divided into a plurality of areas, before points are selected by a computer of the invention.

Figure 5B:
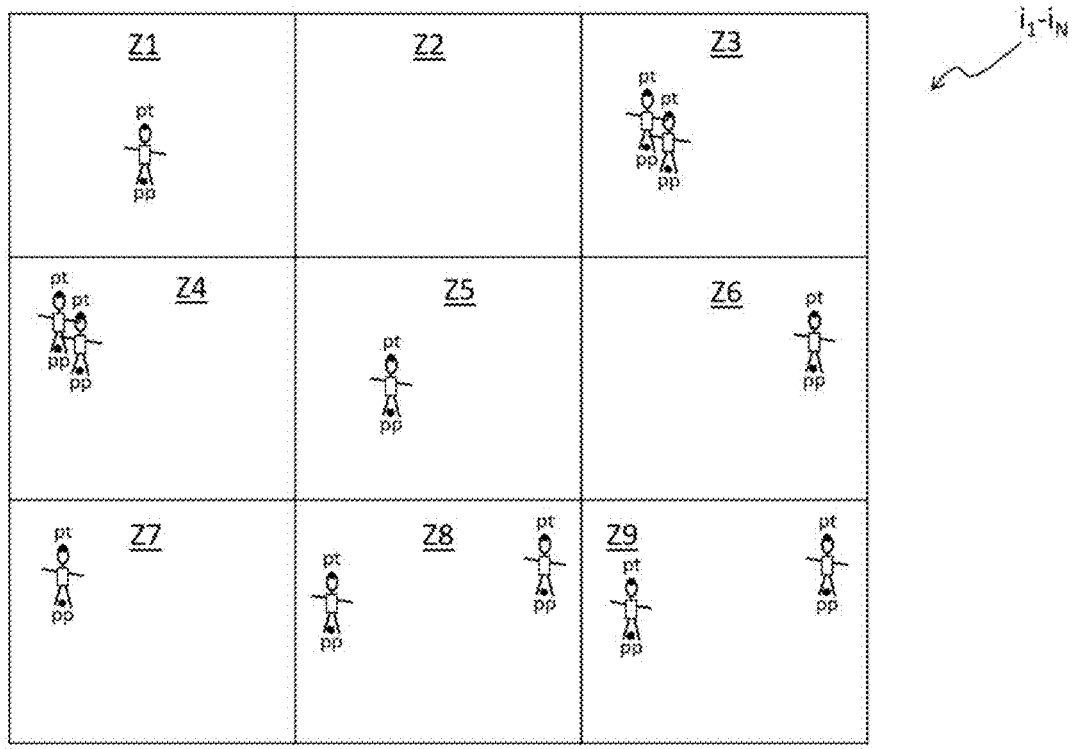

FIG. 5*b* illustrates the same superposition of multiple images from FIG. 5*a*, after points are selected by the computer of the invention.

Figure 6:

FIG. 6 shows a superposition of five images in which three people are moving.

Figure 7:

FIG. 7 shows an image comprising a multitude of people.

Figure 1:
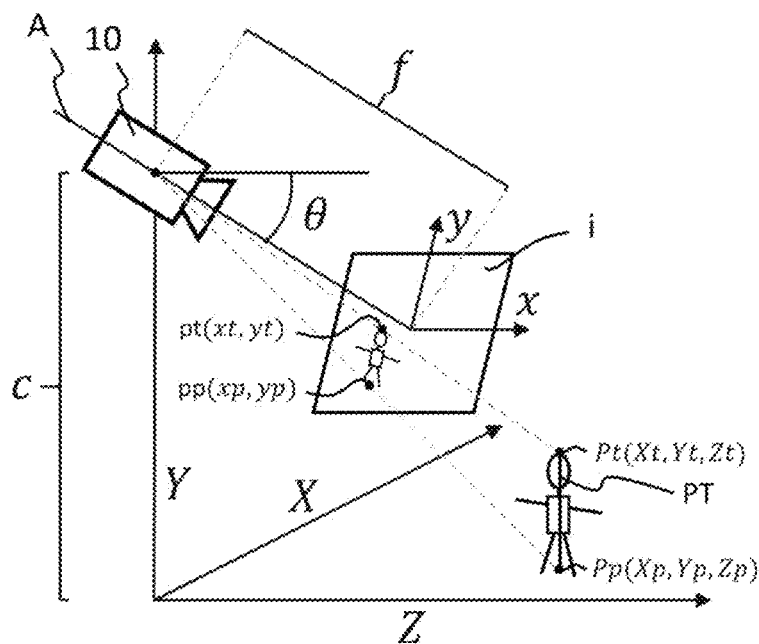
FIG. 1 shows a geometric model of an image reference frame and a real environment.

With reference to FIG. 1, calibration parameters for the imaging device are understood to mean parameters for matching the spatial coordinates of a point in the field of the imaging device, referred to as "real" coordinates as they are expressed in a terrestrial reference frame, with the planar coordinates of the representation of this point in the image acquired by the imaging device, referred to as "image" coordinates, that is to say the projection thereof.

The calibration parameters are shown in FIG. 1 and are:
a transverse angle of inclination θ of the imaging device 10, that is to say the pitch angle defined by the angle between the main axis of the camera A and a horizontal direction,
a focal length f of the imaging device 10,
a height c at which the imaging device 10 is positioned.

The method of the invention comprises determining each of these three calibration parameters. It should be noted that it is still entirely possible for one or the other of these three parameters to be known, directly or indirectly, for example an imaging device may have a calibrated focal length f, or else the height c may have been expressly chosen when installing the camera.

FIG. 1 shows an imaging device 10 positioned at a height above the ground. The environment of the imaging device is referenced in the three-dimensional real world by a terrestrial reference frame the origin of which is a point on the ground vertical to the imaging device 10. The axes of the terrestrial reference frame comprise an axis Y oriented upwards and passing through the imaging device 10, and two axes X, Z located in the plane of the ground above which the imaging device 10 is positioned. The imaging device has the coordinates (X, Y, Z)=(0, c, 0) in the terrestrial reference system.

A standing person is located in the field of view of the imaging device 10. In the terrestrial reference frame, the person is referenced by a head point Pt with coordinates (Xt, Yt, Zt), associated with the head of the person, and a foot point Pp with coordinates (Xp, Yp, Zp), associated with the feet of the person. The head point Pt and the foot point Pp define a foot-head segment PT in the three-dimensional real world of the environment of the imaging device 10.

A two-dimensional image reference system is defined in an image i acquired by the imaging device 10. The image reference system has the centre of the image i as origin and comprises two axes, a horizontal abscissa axis x and a vertical ordinate axis y. In the image reference frame, the head point pt of a person has the coordinates (xt, yt), and the foot point pp of a person has the coordinates (xp, yp).

The imaging device 10 is preferably fixed, at least with regard to the calibration parameters. It could for example be installed on a rail that allows horizontal translational movements. However, the imaging device could be fully mobile provided that its movements are known, and a person skilled in the art will specifically know how to apply the corresponding equations for changing reference system.

Some assumptions are furthermore advantageously made regarding the context:
- the roll angle of the imaging device 10 is assumed to be negligible,
- the yaw angle of the imaging device 10 is assumed to be negligible,
- the distortion in an image i acquired by the imaging device 10 is assumed to be negligible,
- the optical centre of the imaging device 10 corresponds to the centre of the image i,
- the ground of the environment of the imaging device 10, in the field of view of the imaging device 10, is flat.

Figure 2:
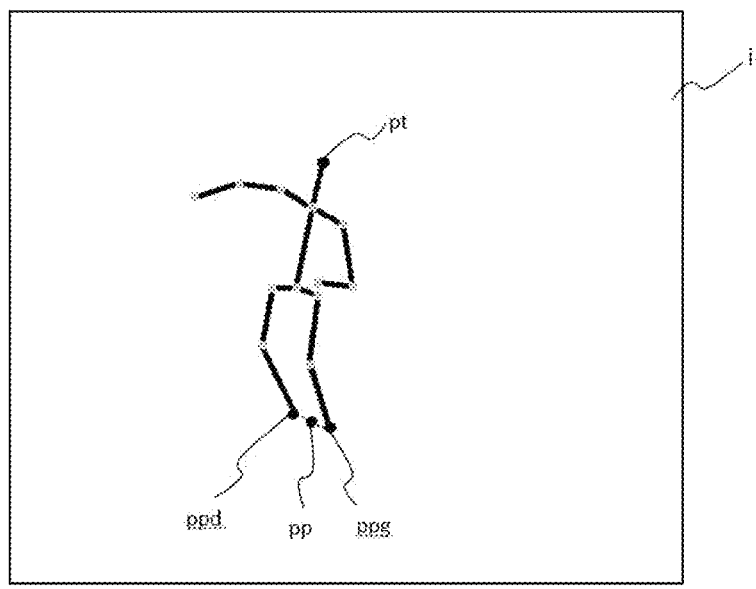
FIG. 2 shows a skeleton-point model of a person in an image.

FIG. 2 illustrates an image i in which a person is modelled in the image i by a fifteen-point skeleton model comprising a head point pt, a left foot point ppg and a right foot point ppd.

Advantageously, the foot point pp of the invention is the midpoint between the left foot point ppg and the right foot point ppd.

Figure 3:
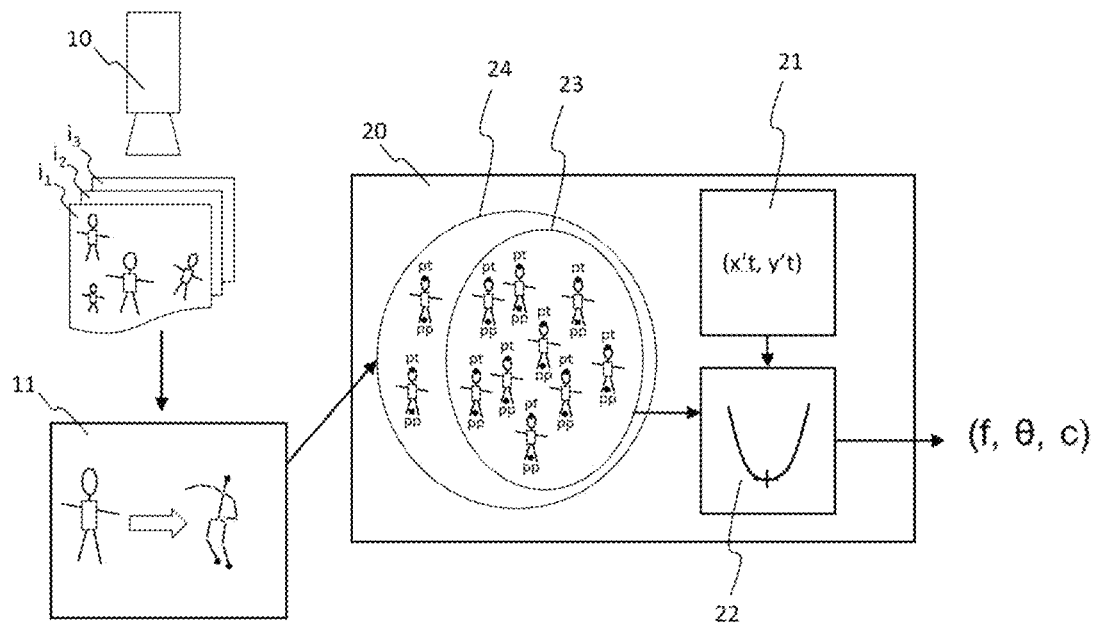
FIG. 3 shows one example of a system for implementing the method for determining calibration parameters according to the invention.

FIG. 3 illustrates a system comprising an imaging device 10, a people detector 11 and a computer 20.

The imaging device 10 is able to acquire images $i_1$, $i_2$, $i_3$ of a scene of its environment. The imaging device 10 is preferably a video camera, but may be a photographic camera able to take for example images of a scene in quick succession.

The people detector 11 is configured to detect people in images $i_1$, $i_2$, $i_3$ acquired by the imaging device 10, and to determine key points of a person, for example so as to generate a fifteen-point skeleton as illustrated in FIG. 2. Advantageously, the key points comprise a head point pt corresponding to the top of the person's head, a left foot point ppg corresponding to the person's left heel, and a right foot point ppd corresponding to the person's right heel.

The people detector 11 may be split into two separate sub-devices able to communicate with one another, a first device being able to detect people in the image i and a second device being able to generate skeleton points corresponding to the person detected by the first device, for example through regression.

Each skeleton point ppg, ppd, pt is associated with two-dimensional coordinates in the image $i_1$, $i_2$, $i_3$.

The two-dimensional coordinates of the skeleton points are able to be used by the computer 20 to execute the method of the invention, directly or after a potential change of reference system if the two-dimensional coordinates are not referenced in the image reference system as described and illustrated in FIG. 1.

Advantageously, each skeleton point ppg, ppd, pt is furthermore associated with a visibility score regarding visibility in the image $i_1$, $i_2$, $i_3$. The visibility score makes it possible to assess the visibility of said skeleton point in the image, and thus therefore represents a reliability indicator for the two-dimensional coordinates of the skeleton point.

The computer 20 comprises an extractor 24 able to extract, from among skeleton points provided by the people detector 11, a head point pt and a foot point pp, for each person detected by the people detector 11.

The computer 20 comprises a selector 23 able to select, from among these head and foot points pt and pp, a plurality of pairs of points (pt, pp) comprising a head point pt and a foot point pp associated with the same person, based on multiple criteria taken on their own or in combination:
- a visibility score associated with the head point pt and/or with the foot point pp, said visibility scores being able to be deduced from the visibility scores associated with the skeleton points provided by the people detector 11,
- a distribution, a location and/or a number of head points pt and foot points pp in the image $i_1$, $i_2$, $i_3$,
- a temporal or geographic proximity of the head and/or foot points pt and/or pp to one another.

The computer 20 comprises a two-dimensional estimator 21 able to determine estimated image coordinates of a head point pt based on the image coordinates (xp, yp) of said foot point pp and on the calibration parameters f, θ, c.

The computer 20 comprises a minimizer 22 able to minimize an error between the image coordinates of the head point pt that are estimated by the estimator 21 and the image coordinates (xt, yt) of the head point pt that originate from the people detector 11.

The extractor 24, the selector 23, the estimator 21 and the minimizer 22 are advantageously software modules of the computer 20.

FIG. 4a and FIG. 4b illustrate the steps of the method according to the invention, which comprise:
- a selection step 102, in which a computer 20 selects a plurality of pairs of points (pt, pp), each pair of points (pt, pp) being associated with a person in an image i, $i_1$, $i_2$, $i_3$ taken by an imaging device 10,
- a step 103 of determining calibration parameters for the imaging device 10 based on the selected plurality of pairs of points (pt, pp).

To be able to select a plurality of pairs of points (pt, pp), the computer 20 generally needs a plurality of images $i_1$, $i_2$, $i_3$ from the imaging device 10 that are acquired at different instants in time, for example multiple images from a video acquired by the imaging device 10. Multiple images $i_1$, $i_2$, $i_3$ allow the computer 20 to select a plurality of pairs of points (pt, pp), even if for example a single person is moving in the scene.

According to one example, FIG. 6 shows a superposition of five images $i_1$-$i_5$ comprising three people, the images $i_1$-$i_5$ being taken at various instants in time by the imaging device 10. This superposition of images $i_1$-$i_5$ comprises fifteen pairs of points (pt, pp) since the three people are moving in the field of the imaging device 10.

In the case for example of a crowd of people in the field of view of the imaging device 10, a single image i acquired by the imaging device 10 allows the computer 20 to select a plurality of pairs of points (pt, pp). Such an image i is for example shown in FIG. 7.

The computer 20 therefore needs pairs of points (pt, pp) originating from at least one image i, $i_1$, $i_2$, $i_3$, $i_4$, $i_5$ acquired by the imaging device 10 and comprising at least one person. These pairs of points (pt, pp) are provided for example by a people detector 11, as described above.

In the selection step 102, the computer 20 selects a plurality of pairs of points (pt, pp) in the at least one image i, $i_1$, $i_2$, $i_3$, $i_4$, $i_5$, each pair of points (pt, pp) comprising a head point pt associated with the head of a person and a foot point pp associated with the feet of said person.

The computer 20 may select pairs of points (pt, pp) as images are acquired by the imaging device, in particular as points are provided by a people detector 11.

As an alternative, the computer 20 may select the plurality of pairs of points (pt, pp) after multiple image acquisitions, for example after a predefined acquisition time period in which images are acquired by the imaging device 10, in particular after a people detector 11 has provided points corresponding to multiple images.

Each point pt, pp of a pair of points (pt, pp) is referenced in the at least one image i, $i_1$, $i_2$, $i_3$, $i_4$, $i_5$ by image coordinates (xt, yt), (xp, yp) comprising an image abscissa xt, xp and an image ordinate yt, yp.

The coordinates of a head point pt in an image i are (xt, yt).

The coordinates of a foot point pp in an image i are (xp, yp).

To determine the calibration parameters (f, θ, c) in a more reliable manner, it is preferable for the plurality of pairs of points (pt, pp) to correspond as far as possible to a homogeneous distribution in the one or more images i, $i_1$, $i_2$, $i_3$, that is to say to a relatively homogeneous distribution of people in the field of view of the imaging device 10.

Thus, as illustrated in FIGS. 5a and 5b, according to one particular embodiment, the at least one image i, $i_1$, $i_2$, $i_3$, $i_4$, $i_5$ acquired by the imaging device 10 is divided into a plurality of areas Z1-Z9, for example nine areas as illustrated in the figures.

To avoid an excessively great imbalance between the various areas Z1-Z9, in particular an area Z8, Z9 populated excessively with pairs of points (pt, pp) in comparison with another area Z1-Z7, the computer 20 selects the plurality of pairs of points (pt, pp) such that each area Z1-Z9 contains a number of pairs of points (pt, pp) less than or equal to a predetermined threshold. The difference in the number of pairs of points between two areas thus cannot exceed this predetermined threshold.

According to this selection mode, the computer 20 retains all pairs of points of an area Z1-Z9 in which the number of pairs of points (pt, pp) is less than or equal to the predetermined threshold.

According to this selection mode, the computer 20 reduces the number of pairs of points (pt, pp) in an area Z1-Z9 in which the number of pairs of points (pt, pp) is greater than the predetermined threshold until reaching said predetermined threshold for the number of pairs of points (pt, pp) in said area Z1-Z9.

As an alternative, the computer 20 selects the number of pairs of points (pt, pp) in each area Z1-Z9 until reaching said predetermined threshold for the number of pairs of points (pt, pp) in said area Z1-Z9, and stops selecting pairs of points for example after a predefined duration has elapsed. Some areas will therefore be populated to the maximum extent with pairs of points (pt, pp), corresponding to the predetermined threshold, and other areas will be less populated with pairs of points (pt, pp), for example because the imaging device captured fewer people in these other areas during the predefined duration.

In FIG. 5a, the illustrated pairs of points (pt, pp) originate from a plurality of N images $i_1$-$i_N$ acquired by the imaging device 10 for example over 10 seconds, the points pt, pp shown corresponding to people detected by a people detector 11.

In FIG. 5b, the illustrated pairs of points (pt, pp) represent the plurality of pairs of points (pt, pp) selected by the computer 20, such that each area Z1-Z9 contains a number of pairs of points (pt, pp) less than or equal to the predetermined threshold, in this case equal to two.

For example, the selection of pairs of points (pt, pp) to limit the number of pairs of points (pt, pp) in an area Z1-Z9 to a number less than or equal to the predetermined threshold is random or pseudorandom.

For example, the selection of pairs of points (pt, pp) to limit the number of pairs of points (pt, pp) to a number less than or equal to the predetermined threshold is such that preference is given to a distribution of pairs of points that is as uniform as possible in the area.

For example, the selection of pairs of points (pt, pp) to limit the number of pairs of points (pt, pp) to a number less than or equal to the predetermined threshold is such that, for two pairs of points (pt, pp) having image coordinates that are geographically close in the image, if the distance between two head points pt and/or two foot points pp is less than a predetermined distance, one of the pairs of points (pt, pp) may be removed.

To avoid redundancy or quasi-redundancy of pairs of points (pt, pp) that are excessively geographically close to one another in an image, the computer may select pairs of points (pt, pp) corresponding to images from the imaging device by way of the computer that are spaced in time by a predetermined period, for example a period of between 100 ms and 500 ms.

The selection step 102 comprises an optional filtering step 101, in which the computer 20 filters pairs of points (pt, pp) based on a visibility criterion of said points in order to select the plurality of pairs of points (pt, pp).

For example, the visibility criterion is based on a visibility score associated with the head and foot points pt and pp and provided by the people detector 11. According to one exemplary embodiment, below a threshold for a visibility score associated with a head point pt or with a foot point pp of a person, the corresponding pair of points (pt, pp) is not retained in the plurality of pairs of points.

In a determination step 103, a two-dimensional estimator 21 of the computer 20 determines estimated image coordinates (x't, y't) of a head point pt based on the image coordinates (xp, yp) of the foot point pp of a person and on the calibration parameters (f, θ, c).

To determine the estimated image coordinates (x't, y't) of a head point pt based on the image coordinates (xp, yp) of the foot point pp, the estimator 21 makes the following approximations:
- in the three-dimensional real world of the environment of the imaging device, people are all of the same size, that is to say that all foot-head segments PT have the same predetermined height H.
- in the three-dimensional real world of the environment of the imaging device, people are all standing and upright, that is to say that all foot-head segments PT are vertical.

The projection matrix P of the imaging device 10 is defined based on the calibration parameters (f, θ, c) as follows:

$$P = \begin{bmatrix} f & 0 & 0 \\ 0 & f & 0 \\ 0 & 0 & 1 \end{bmatrix} \cdot \begin{bmatrix} 1 & 0 & 0 \\ 0 & \cos(\theta) & -\sin(\theta) \\ 0 & \sin(\theta) & \cos(\theta) \end{bmatrix} \cdot \begin{bmatrix} 1 & 0 & 0 & 0 \\ 0 & 1 & 0 & -c \\ 0 & 0 & 1 & 0 \end{bmatrix}$$

$$P = \begin{bmatrix} f & 0 & 0 & 0 \\ 0 & f \cdot \cos(\theta) & -f \cdot (\sin(\theta) & -f \cdot c \cdot \cos(\theta) \\ 0 & \sin(\theta) & \cos(\theta) & -c \cdot \sin(\theta) \end{bmatrix}$$

The terrestrial reference frame and the image reference system are as shown in FIG. 1.

An image point with coordinates (x,y) in the image reference system corresponds to a real point with coordinates (X,Y,Z) in the terrestrial reference frame, via the calibration parameters (f, θ, c).

More specifically, it is possible to obtain a homogeneous representation (xh,yh,wh) of an image point through multiplication by the projection matrix P of the homogeneous representation (Xh,Yh,Zh,1) of a corresponding real point, using the following relationship:

$$\begin{bmatrix} xh \\ yh \\ wh \end{bmatrix} = P \cdot \begin{bmatrix} Xh \\ Yh \\ Zh \\ 1 \end{bmatrix} = \begin{bmatrix} f & 0 & 0 & 0 \\ 0 & f \cdot \cos(\theta) & -f \cdot (\sin(\theta) & -f \cdot c \cdot \cos(\theta) \\ 0 & \sin(\theta) & \cos(\theta) & -c \cdot \sin(\theta) \end{bmatrix} \cdot \begin{bmatrix} Xh \\ Yh \\ Zh \\ 1 \end{bmatrix}$$

-continued
$$\begin{bmatrix} xh \\ yh \\ wh \end{bmatrix} = \begin{bmatrix} f \cdot Xh \\ f \cdot \cos(\theta) \cdot Yh - f \cdot \sin(\theta) \cdot Zh - f \cdot c \cdot \cos(\theta) \\ \sin(\theta) \cdot Yh + \cos(\theta) \cdot Zh - c \cdot \sin(\theta) \end{bmatrix}$$

Switching back to Cartesian coordinates gives the following relationship between an image point with coordinates (x,y) in the image reference system and a real point with coordinates (X,Y,Z) in the terrestrial reference frame:

$$\begin{bmatrix} x \\ y \end{bmatrix} = \begin{bmatrix} f \cdot X/(\sin(\theta) \cdot Y + \cos(\theta) \cdot Z - c \cdot \sin(\theta)) \\ (f \cdot \cos(\theta) \cdot Y - f \cdot \sin(\theta) \cdot Z - f \cdot c \cdot \cos(\theta))/(\sin(\theta) \cdot Y + \cos(\theta) \cdot Z - c \cdot \sin(\theta)) \end{bmatrix}$$

Using the approximations made by the estimator 21 of the computer 20, any person in the field of view of the device 10 has a vertical foot-head segment PT of height H.

Thus, it is possible to write that, for a person, in the terrestrial reference frame:

$$Xp=Xt, Zp=Zt, Yp=0 \text{ and } Yt=H.$$

The image coordinates (xt, yt) of a head point (pt) and the image coordinates (xp, yp) of a foot point (pp) may thus be expressed based on their real coordinates (Xt, Yt, Zt), (Xp, Yp, Zp) and on the calibration parameters (f, θ, c) as follows:

$$\begin{bmatrix} xp \\ yp \end{bmatrix} = \frac{f}{\cos(\theta) \cdot Zp - c \cdot \sin(\theta)} \cdot \begin{bmatrix} Xp \\ -\sin(\theta) \cdot Zp - c \cdot \cos(\theta) \end{bmatrix}$$

$$\begin{bmatrix} xt \\ yt \end{bmatrix} = \frac{f}{H \cdot \sin(\theta) + \cos(\theta) \cdot Zp - c \cdot \sin(\theta)} \cdot \begin{bmatrix} Xp \\ Yp \cdot \cos(\theta) - \sin(\theta) \cdot Zp - c \cdot \cos(\theta) \end{bmatrix}$$

On the basis of these expressions and after simplification, the estimator 21 of the computer 20 determines estimated image coordinates (x't, y't) of a head point pt of a person in an image i using the following equations:

$$x't = \frac{\cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot xp$$

and $$y't = \frac{H \cdot \cos(\theta) - \sin(\theta) \cdot c \cdot \frac{\sin(\theta) \cdot yp - f \cdot \cos(\theta)}{\cos(\theta) \cdot yp + f \cdot \sin(\theta)} - c \cdot \cos(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot f$$

The units in relation to these equations are as follows:
the average height H of a person is in centimetres,
the focal length f is in pixels,
the angle θ is in radians,
the height c is in centimetres.

The height H is a parameter to be adjusted. It represents an average height of the people.

Next, a minimizer 22 of the computer 20 determines the calibration parameters (f, θ, c) by performing an error minimization between said estimated image coordinates (x't, y't) of the head point (pt) estimated by the two-dimensional estimator 21 and said image coordinates (xt, yt) of the corresponding head point (pt).

For example, the height H is fixed at a predetermined value corresponding to an average size of a person, 160 cm.

The error minimization comprises for example using a regression algorithm that minimizes a mean squared error function between said estimated image coordinates (x't, y't) of the head point pt estimated by the estimator 21, and said image coordinates (xt, yt) of the corresponding head point pt.

For a plurality of pairs of points (pt, pp) comprising M pairs of points (pt, pp), the aim is then to find the calibration parameters (f, θ, c) that minimize the following error function:

$$(f, \theta, c) = \underset{(f,\theta,c)}{\operatorname{argmin}} \frac{1}{M} \sum_{1}^{M} \left((xt - x't)^2 + (yt - y't)^2\right)$$

Advantageously, the error minimization comprises an exhaustive search for the calibration parameters (f, θ, c) over a predetermined discretized domain.

According to one exemplary embodiment, the domain is defined by the following three ranges f∈ [0.1·hi, 6·hi]

$$\theta \in \left[-\frac{\pi}{4}, \frac{\pi}{2}\right],$$

c∈ [50, 4500], where hi is the height of the image expressed in pixels, each range being discretized into fifty values that are distributed uniformly over each of the ranges.

Thus, 125 000 values of triplets of calibration parameters (f, θ, c) are verified, the calibration parameters (f, θ, c) minimizing the error between the estimated image coordinates (x't, y't) of the head point pt estimated by the two-dimensional estimator and the image coordinates (xt, yt) of the head point pt being those retained by the minimizer 22 of the computer 20.

In the case of using a regression algorithm that minimizes a mean squared error function, the calibration parameters (f, θ, c) minimizing the mean squared error function are those retained by the minimizer 22 of the computer 20.

The error minimization comprises for example using a gradient descent method.

In particular, the gradient descent method is based on the L-BFGS-B algorithm.

Advantageously, the error minimization combines two examples proposed above. The error minimization thus comprises two steps, a first step 103a comprising an exhaustive search for intermediate calibration parameters (fi, θi, ci) over a predetermined discretized domain, and a second step 103b comprising using a gradient descent method initialized on said intermediate calibration parameters (fi, θi, ci) resulting from the first step.

In the case of using a regression algorithm that minimizes a mean squared error function, the gradient descent method is initialized on the intermediate calibration parameters (fi, θi, ci) minimizing the following error function:

$$(fi, \theta i, ci) = \underset{(f,\theta,c)}{\operatorname{argmin}} \frac{1}{M} \sum\nolimits_{1}^{M} \left((xt - x't)^2 + (yt - y't)^2\right).$$

The number of images needed for the method of the invention depends on the computer selection method.

According to the method of the invention and according to a first method, the computer 20 selects the plurality of pairs of points (pt, pp) from among points relating to a number of images $i_1$-$i_N$ corresponding to a predefined acquisition time period in which images are acquired by the imaging device 10.

According to a second method in which the pairs of points (pt, pp) are selected by the computer 20 as images are acquired by the imaging device 10, the number of images $i_1$-$i_N$ corresponds to a number of pairs of selected points (pt, pp) that is reached in relation to a predetermined value, globally or in relation to areas Z1-Z9 in the images.

The invention claimed is:

1. A method for determining calibration parameters for an imaging device by way of a computer, based on at least one image acquired by the imaging device, the at least one image including multiple people or based on a plurality of images acquired by the imaging device at different instants in time, the plurality of images including at least one person, the method for determining calibration parameters comprising:

selecting, by way of the computer, a plurality of pairs of points in the at least one image, each pair of points having a head point associated with the head of a person and a foot point associated with the feet of said person, each point of a pair of points being referenced in the at least one image by image coordinates having an image abscissa xt, xp and an image ordinate yt, yp, each pair of points defining a foot-head segment in the three-dimensional real world of the environment of the imaging device;

determining calibration parameters by way of the computer, wherein the computer includes an estimator able to determine an estimated image ordinate y't of a head point based on the image ordinate of the foot point of a person and on the calibration parameters through an approximation that, in the three-dimensional real world of the environment of the imaging device, all foot-head segments have the same predetermined height H and are vertical, wherein the estimator is two-dimensional and is furthermore able to determine an estimated image abscissa x't of a head point based on the image coordinates of the foot point, and wherein determining the calibration parameters further comprises minimizing an error between said estimated image coordinates of the head point estimated by the two-dimensional estimator and said image coordinates of the corresponding head point, wherein the calibration parameters include:
   a transverse angle of inclination $\theta$ of the imaging device,
   a focal length $f$ of the imaging device, and
   a height c at which the imaging device is positioned, and
   wherein the estimator determines the estimated image coordinates using the following equations:

$$x't = \frac{\cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot xp$$

and $$y't = \frac{H \cdot \cos(\theta) - \sin(\theta) \cdot c \cdot \frac{\sin(\theta) \cdot yp - f \cdot \cos(\theta)}{\cos(\theta) \cdot yp + f \cdot \sin(\theta)} - c \cdot \cos(\theta)}{H \cdot \sin(\theta) + \cos(\theta) \cdot c \cdot \frac{\sin(\theta) \cdot yp - f \cdot \cos(\theta)}{\cos(\theta) \cdot yp + f \cdot \sin(\theta)} - c \cdot \sin(\theta)} \cdot f.$$

2. The method for determining calibration parameters according to claim 1, wherein the error minimization includes using a regression algorithm that minimizes a mean squared error function between said estimated image coordinates of the head point estimated by the estimator and said image coordinates of the corresponding head point.

3. The method for determining calibration parameters according to claim 1, wherein the error minimization includes an exhaustive search for the calibration parameters over a predetermined discretized domain.

4. The method for determining calibration parameters according to claim 1, wherein the error minimization includes using a gradient descent method.

5. The method for determining calibration parameters according to claim 1, wherein the error minimization includes two steps, a first step including an exhaustive search for intermediate calibration parameters over a predetermined discretized domain, and a second step including using a gradient descent method initialized on said intermediate calibration parameters resulting from the first step.

6. The method for determining calibration parameters according to claim 1, wherein the selecting further comprises filtering by the computer filters pairs of points of the plurality of pairs of points based on a visibility criterion of said points in order to select the plurality of pairs of points.

7. The method for determining calibration parameters according to claim 1, wherein the at least one image acquired by the imaging device is divided into a plurality of areas, the plurality of pairs of points being selected by the computer in the selecting such that each area contains a number of pairs of points less than or equal to a predetermined threshold.

8. The method for determining calibration parameters according to claim 1, wherein the plurality of pairs of points result from a plurality of images acquired by the imaging device, and the number of images correspond to a predefined time period in which images are recorded by the imaging device.

9. A non-transitory computer program product comprising program instructions implementing the method for determining calibration parameters according to claim 1 when the program instructions are executed by a computer.

10. A method for determining calibration parameters for an imaging device by way of a computer, based on at least one image acquired by the imaging device, the at least one image including multiple people or based on a plurality of images acquired by the imaging device at different instants in time, the plurality of images including at least one person, the method for determining calibration parameters comprising:

selecting, by way of the computer, a plurality of pairs of points in the at least one image, each pair of points having a head point associated with the head of a person and a foot point associated with the feet of said person, each point of a pair of points being referenced in the at least one image by image coordinates having an image abscissa and an image ordinate, each pair of points defining a foot-head segment in the three-dimensional real world of the environment of the imaging device;

determining calibration parameters by way of the computer, wherein the computer includes an estimator able to determine an estimated image ordinate of a head point based on the image ordinate of the foot point of a person and on the calibration parameters through an approximation that, in the three-dimensional real world of the environment of the imaging device, all foot-head segments have the same predetermined height and are vertical, wherein the estimator is two-dimensional and is furthermore able to determine an estimated image abscissa of a head point based on the image coordinates of the foot point, and wherein determining the calibration parameters further comprises minimizing an error between said estimated image coordinates of the head point estimated by the two-dimensional estimator and said image coordinates of the corresponding head point, wherein the error minimization includes using a regression algorithm that minimizes a mean squared error function between said estimated image coordinates of the head point estimated by the estimator and said image coordinates of the corresponding head point.

11. A method for determining calibration parameters for an imaging device by way of a computer, based on at least one image acquired by the imaging device, the at least one image including multiple people or based on a plurality of images acquired by the imaging device at different instants in time, the plurality of images including at least one person, the method for determining calibration parameters comprising:

selecting, by way of the computer, a plurality of pairs of points in the at least one image, each pair of points having a head point associated with the head of a person and a foot point associated with the feet of said person, each point of a pair of points being referenced in the at least one image by image coordinates having an image abscissa and an image ordinate, each pair of points defining a foot-head segment in the three-dimensional real world of the environment of the imaging device;

determining calibration parameters by way of the computer, wherein the computer includes an estimator able to determine an estimated image ordinate of a head point based on the image ordinate of the foot point of a person and on the calibration parameters through an approximation that, in the three-dimensional real world of the environment of the imaging device, all foot-head segments have the same predetermined height and are vertical, wherein the estimator is two-dimensional and is furthermore able to determine an estimated image abscissa of a head point based on the image coordinates of the foot point, and wherein determining the calibration parameters further comprises minimizing an error between said estimated image coordinates of the head point estimated by the two-dimensional estimator and said image coordinates of the corresponding head point, wherein the error minimization includes an exhaustive search for the calibration parameters over a predetermined discretized domain or wherein the error minimization includes using a gradient descent method.

* * * * *